United States Patent Office 3,711,480
Patented Jan. 16, 1973

3,711,480
SYNTHESIS OF PERCHLORINATED
CYANO COMPOUNDS
Sven H. Ruetman, Walnut Creek, Calif., assignor to The
Dow Chemical Company, Midland, Mich.
No Drawing. Filed Feb. 26, 1970, Ser. No. 14,637
Int. Cl. C07d 51/76, 51/36
U.S. Cl. 260—250 R               11 Claims

ABSTRACT OF THE DISCLOSURE

Perchlorinated cyanoaromatic compounds containing at least 2 chlorine substituents in the ring are prepared in a process which comprises introducing one of an alkylamino homocyclic or N-heterocyclic aromatic compound, usually carried in a substantially inert diluent, both being in the vapor phase, into a reaction zone and contacting this mixture in a rapid, turbulent mixing step with at least 15 moles of chlorine per mole of alkylamino aromatic compound and recovering the corresponding cyanoaromatic compound. The reaction zone is maintained at a temperature in the range of from about 500° C. to about 650° C.

SUMMARY OF THE INVENTION

The present invention is directed to a process for preparing perchlorinated cyanoaromatic compounds by the vapor phase chlorination of aromatic compounds containing an alkylamino substituent on the ring. The process comprises introducing one of an alkylamino substituted homocyclic or N-heterocyclic aromatic compound, usually carried in a substantially inert diluent, both being in the vapor phase, into a reaction zone maintained at a temperature of about 500° C. to about 650° C. and contacting this mixture in a rapid, turbulent mixing step with at least 15 mole of chlorine per mole of alkylamino aromatic compound.

In the present specification and claims, the term "alkylamino" is employed to designate a mono- or dialkylamino group wherein each alkyl portion independently contains from 1 to 3 carbon atoms.

In the present specification and claims, the term "homocyclic" is employed to designate a compound containing at least one six-membered ring containing only carbon atoms as ring-forming atoms and having aromatic properties by virtue of conjugated double bonds in said ring. In general, the homocyclic compounds having one ring are preferred.

In the present specification and claims, the term "N-heterocyclic aromatic compound" is employed to designate a heterocyclic nitrogen compound containing at least one six-membered ring containing only nitrogen and carbon atoms as ring-forming atoms and having aromatic properties by virtue of conjugated double bonds in said ring. In general, the N-heterocyclic aromatic compounds having one or two nitrogen atoms in the ring as well as those compounds containing one ring are preferred.

The above terms, i.e. homocyclic and N-heterocyclic aromatic compounds, are further inclusive of such ring compounds bearing one or a plurality of neutral substituents on the carbon atoms of the ring. Such substituents include chloro, bromo, iodo, nitro, cyano, methyl, trichloromethyl or trifluoromethyl groups. The bromo, iodo, methyl, trichloromethyl, trifluoromethyl and nitro groups are removed during the reaction by chlorinolysis. The reaction can be represented by the following:

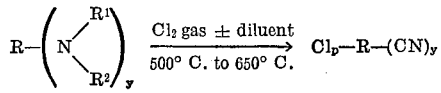

In the above formula, R represents

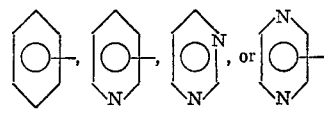

$R^1$ represents loweralkyl of from 1 to 3 carbon atoms, inclusive; $R^2$ represents hydrogen or loweralkyl of from 1 to 3 carbon atoms, inclusive; $y$ represents an integer of 1 or 2, both inclusive, and $p$ represents an integer of from 2 to 5, both inclusive.

Representative alkylamino aromatic compounds useful as starting material for the chlorination process of the present invention include N-methylaniline, N,N-dimethylanaline, N-ethylaniline, N,N-diethylaniline, N-methyl-N-ethylaniline, N-(n-propyl)aniline, N-isopropylaniline, N-methyl-o-chloroaniline, N-methyl-m-cyanoaniline, N-N-diethyl-m-trifluoromethylaniline, 2-chloro-3-(methylamino)pyridine, 2 - (methylamino)pyridine, 6-chloro-2-(n-propylamino)pyridine, 2,6 - bis - (methylamino)pyridine, 2,6 - bis-(dimethylamino)pyridine, 6-cyano-2-(ethylamino)pyridine, 2,3,5 - trichloro-6-(dimethylamino)pyrazine, 2-(dimethylamino)pyrazine, 2-(propylamino)pyrazine, 2-chloro-5-(dimethylamino)pyramidine and 2-chloro-4-(dimethylamino)pyrimidine.

The diluents suitable for carrying out the process of the present invention are materials substantially inert to or not detrimentally reactive with the reactants and/or product, particularly the chlorine gas, under the reaction conditions employed. Representative operable diluents include, for example, trichloromethane, dichloromethane, nitrogen, carbon dioxide, carbon tetrachloride and the like with carbon tetrachloride being preferred. Although a diluent of the type set forth hereinbefore is preferred, a diluent does not necessarily have to be employed. When a diluent is employed, a suitable proportion of feed compound in the diluent is from about 0.5 percent by weight to saturation at a temperature just below the boiling point of the solution. With many feeds and depending upon the results desired, an excess of the chlorine gas reactant, greater than set forth hereinafter, itself, can be used as the reaction medium or diluent.

In carrying out the process of the present invention, mixed vapors of an alkylamino substituted aromatic compound and an appropriate diluent, if employed, are rapidly and turbulently mixed with an excess of gaseous chlorine, over the stoichiometric amount, during a brief contact time at temperatures in the range of from about 500° to about 650° C.

It is critical and essential for the production of the desired products and avoidance of extensive degradation and tar formation that there be rapid and turbulent mixing of the reactants. It is further essential that the process be carried out in a manner such that the alkylamino aromatic compound be contacted with excess chlorine. Generally, there should be provided from about 15 to 100 moles of chlorine per mole of alkylamino aromatic compound in the reaction mixture. It is among the advantages of the present process that when the reactants and diluent, if employed, are mixed in the specified manner, an exothermic, homogeneous reaction ensues. Thus, in an adiabatic reactor, the reaction proceeds to good yields of desired product without the need for catalysts.

Preferred conditions for carrying out the reaction include a temperature of about 550° to about 625° C. Although the exact residence time is not critical, the reactants should not be permitted to remain in contact for a prolonged period. The contact period or residence time depends on the temperature within the operable ranges of temperature for particular products. For example, lowering the reaction temperature ten degrees may double the permissible residence time but such temperature reduction will ultimately be limited by the operable range for obtaining a particular product. Residence time generally will not exceed about 60 seconds. The preferred time for contact is from about 5 to about 25 seconds.

Operating pressures are not critical and may vary from subatmospheric to somewhat superatmospheric. Atmospheric pressure is satisfactory and is preferred.

In carrying out the reaction, the alkylamino aromatic compound can be sprayed into the reactor through an atomizer as a melt or as a solution in the diluent. Ordinarily, however, the materials are first introduced into an evaporator to produce a vaporized mixture of the feed compound in the diluent. The evaporator is maintained at a temperature at which rapid vaporization occurs, usually in the range of from about 215° C. to about 350° C., preferably from about 10° C. to 50° C. above the boiling point of the starting material. Any suitable vaporizing device can be employed as evaporator but a wiped film evaporator has been found to be convenient. For efficient operation, it is necessary that the rate of introduction and/or temperature of the evaporator be maintained so as to completely vaporize the alkylamino aromatic reactant and maintain the compound in the vaporized state. It has been noted that incomplete vaporization results in decreased yield of the desired perchlorinated cyanoaromatic product. The mixed feed-diluent vapors which are produced are conducted from the evaporator or atomizer and rapidly and turbulently mixed with the gaseous chlorine. Preferably, the mixing occurs at a point just prior to the point of entry to the reactor, and the resulting gaseous reaction mixture is conducted directly in turbulent flow into the hot reactor where, in the vapor phase, a reaction takes place at a temperature within the range of from about 500° C. to about 650° C. with the formation of the desired perchlorocyanoaromatic compound. In one preferred embodiment, the reactants are mixed in a nozzle just prior to being injected therefrom into the reactor. Alternatively, the mixed vapors of the alkylamino aromatic reactant and diluent and the gaseous chlorine may be simultaneously but separately introduced into the reactor. In such case, the gaseous chlorine is jetted in at a point close to the point of introduction of the feed compound in such manner to ensure virtually instantaneous mixing and turbulent flow of the reactants. The turbulence must be such as to provide a Reynolds number of at least 800. The preferred Reynolds number is about 2000. Generally, an inlet vapor velocity of about 1000 to 5000 centimeters per second is considered desirable. If desired, an insulated reactor is employed so as to permit reaction to take place under adiabatic conditions, but this is not essential in the practice of the instant process. The vapors passing from the reactor are cooled or quenched to separate (a) a liquid mixture comprising perchlorinated cyanoaromatic product, diluent and any unreacted aromatic starting materials (as the hydrochloride) from (b) a gaseous mixture comprising chlorine and hydrogen chloride by-product. The liquid mixture is base neutralized and is usually treated in a manner to recover the desired products in substantially pure form. Such treatments include distillation, extraction, or fractional crystallization. Alternatively, the liquid mixture is cooled to precipitate the product which is recovered by filtration and the filtrate recycled to the evaporator preheater for further reaction. The gas mixture is scrubbed according to conventional procedures to separate chlorine from hydrogen chloride. The former is dried and recycled while the latter is recovered, for example, as aqueous hydrochloric acid. The perchlorocyanoaromatic product whether recovered by distillation, precipitation, filtration or other conventional procedure, can be further purified, if desired, by methods well known to the skilled in the art such as recrystallization from carbon tetrachloride.

Any suitable reactor is employed, however, the reactor preferably is designed to prevent or minimize back-mixing of the chlorinated product with the unchlorinated feed compound. Since the reaction is not strongly exothermic, heating is generally required, particularly at the initiation of the reaction. Thereafter heat input is only necessary to compensate for heat loss to the environment. The inlets, outlets and interior surfaces of the reactor should be of materials such as are known to resist corrosion by chlorine and hydrogen chloride at high temperatures. Thus, for example, all nickel or glass units or units with the interior surfaces lined with nickel, carbon, silica or glass are satisfactory. In practice, it has been found that thermally resistant, high-silica glass such as Vycor brand is satisfactory for small reactors. In large scale apparatus, it is convenient to employ a shell of nickel lined with fused silica or a suitable refractory such as carbon. To accomplish the essential rapid, turbulent mixing and introduction of the reactants into the reaction zone, the reactor is normally fitted with a mixing nozzle, as described above, for introducing the reactants with substantially simultaneous mixing. Alternatively, the organic reactant plus diluent and the chlorine are introduced into the reactor by separate but closely adjacent orifices adjusted so that the chlorine is jetted into the incoming stream of organic reactant plus diluent. In a further embodiment wherein the feed compound, diluent and chlorine are introduced into the reactor with mixing immediately prior to such introduction, the mixing and introduction are carried out in a tube or the like of a diameter which is small in relation to the diameter of the reactor whereby turbulence at the point of entrance into the reactor is achieved at Reynolds numbers as low as 800 in accordance with known principles. In one preferred form of apparatus, the reactor proper is in the form of a cylinder having a length of 5 times the diameter. Conventional accessories, such as flowmeters on the inputs and condensers, cooling tubes or a quench tower for the exit gases, are employed as is understood by one skilled in the art.

In a preferred method for carrying out the process according to the present invention, a mixture of one of an alkylamino benzene, -pyrazine, -pyrimidine or -pyridine reactant and a chlorohydrocarbon diluent is introduced into a wiped film evaporator where the reactant and diluent are vaporized, the vapors are rapidly mixed with gaseous chlorine within the reactant ratio set forth hereinbefore and introduced into a heated reactor at high turbulence, i.e. Reynolds number of at least 800 and reacted within a temperature range of from about 500° C. to about 650° C. thereby to produce the desired corresponding perchlorocyanobenzene, -pyrazine, -pyrimidine or -pyridine product. The mixture of desired product and any unreacted starting materials or by-products, such as hydrogen chloride, is conducted from the reactor, condensed to separate the product from volatile by-products and the product recovered from the liquid condensate by conventional procedures as set forth hereinbefore.

Description of the preferred embodiments

The following examples illustrate the invention but are not to be construed as limiting:

Example 1: A cylinder of Vycor high-silica glass of 8.75 cm. diameter and about 4.5 cm. in length was tapered to inlet and outlet tubes and fitted with electrical heating coils and efficient insulation to serve as a reactor having a capacity of about 1.35 liters. The outlet was connected to a coolable collection vessel and the latter was vented through a reflux condenser to an acid-gas recovery system. The inlet tube ended in a nozzle projecting 2.5 centimeters into the reactor and having an opening into the reactor 0.25 centimeter in diameter. Inside the nozzle was a smaller concentric tube for chlorine introduction ending 1.25 centimeters before said nozzle opening. The upstream end of the inlet tube was connected to an electrically heated vaporizer-preheater tube for introduction of an alkylaminopyridine reactant and diluent therethrough.

A solution consisting of 10 percent by weight of 2-(methylamino)pyridine and 90 percent by weight of carbon tetrachloride is metered into the vaporizer-preheater at a rate of about 2.38 grams per minute while the vaporizer is heated so that the resulting vapor mixture passes to the inlet nozzle at a temperature of about 225° C. In the nozzle the 2-(methylamino)pyridine and diluent vapor are rapidly mixed with chlorine as the reactant mixture is forced through the nozzle into the reactor at a velocity of about 2680 centimeters per second. The chlorine is introduced at a rate of 7.0 grams per minute to provide the equivalent of 45 moles of chlorine per mole of 2-(methylamino)pyridine in the reaction mixture. The reaction is carried out at a reactor temperature of 600° C. with a residence time in the reactor of about 10 seconds and a total run time of 42 minutes. The hot effluent gases from the reactor are trapped in two consecutive of Dry Ice traps. The excess chlorine, hydrogen chloride by-product and diluent are removed from the effluent by evaporation on a steam bath. The residual crude solid product is extracted with methylene dichloride. The separated methylene dichloride solution is contacted with activated charcoal. The methylene dichloride is removed by evaporating on a steam bath leaving 17 grams of a product which is found by gas-liquid chromatography (G.L.C.) to be a mixture of about 12 mole percent of pentachloropyridine and about 85 mole percent of the desired tetrachloro-2-cyanopyridine product in a yield of 64 percent of theoretical. The tetrachloro-2-cyanopyridine is recrystallized from carbon tetrachloride and recovered in a yield of 24 percent of theoretical and has a melting point of 150.5°–151.5° C.

Example 2: Using the apparatus and general procedure as described in Example 1, a solution of 10 percent by weight of 6-chloro-2-(n-propylamino)pyridine in carbon tetrachloride is passed through the vaporizer at a temperature of about 325° C. The resulting vapor mixture is mixed in the nozzle with the equivalent of 79 moles of chlorine per mole of 6-chloro-2-(n-propylamino)-pyridine and passed into the reactor at a nozzle velocity of about 2750 centimeters per second. The reaction is carried out at a reactor temperature of 600° C., a residence time of about 10 seconds and a total run time of 56 minutes, to produce a crude product in a yield of 11.5 grams. The crude product contains about 39 mole percent of tetrachloro-2-cyanopyridine, about 27 mole percent of pentachloropyridine and about 9 mole percent of unidentified material as determined by G.L.C. analysis. The feed rate for this reaction is 2.22 grams per minute and the chlorine rate is 7.0 grams per minute.

Example 3: The apparatus and general procedure of Example 1 is employed with the following variables:

Pyridine feed: solution of 5 percent by weight of 2,6-bis(methylamino)pyridine in carbon tetrachloride.
Feed rate: 2.16 grams per minute.
Vaporizer temperature: about 350° C.
Molar ratio of chlorine/2,6-bis(methylamino)pyridine: about 60.
Chloriie fee drate: 3.4 grams per minute.
Nozzle velocity: 1400 centimeters per second.
Reactor temperature: 550° C.
Residence time: about 20 seconds.
Total run time: 84 minutes.

3 grams of a crude product containing 3,4,5-trichloro-2,6-dicyanopyridine as the major component (47 mole percent) 29 mole percent of tetrachloro-2-cyanopyridine and 4 mole percent of pentachloropyridine is obtained.

Example 4: The apparatus and general procedure of Example 1 is employed with the following variables:

Pyridine feed: solution of 5.3 percent by weight of 2,6-bis(dimethylamino)pyridine in carbon tetrachloride.
Feed rate: 2.31 grams per minute.
Vaporization temperature: about 300° C.
Molar ratio of chlorine/2,6-bis(dimethylamino)pyridine: about 63.
Chlorine feed rate: 3.3 grams per minute.
Nozzle velocity: 1500 centimeters per second.
Reactor temperature: 600° C.
Residence time: about 18 seconds.
Total run time: 82 minutes.

18 grams of a crude product is obtained which upon G.L.C. analysis is shown to contain 26 mole percent 3,4,5-trichloro-2,6-dicyanopyridine, 14 mole percent tetrachloro-2-cyanopyridine and 7 mole percent of pentachloropyridine.

Example 5: The general procedure of Example 1 is employed with a similar reactor having a capacity of 2.25 liters and the following variables:

Feed: solution of 8.25 percent by weight of N-methylaniline in carbon tetrachloride.
Feed rate: 6.38 grams per minute.
Vaporization temperature: about 215° C.
Molar ratio of chlorine/N-methylaniline: about 20.
Chlorine feed rate: 7.0 grams per minute.
Nozzle velocity: about 3480 centimeters per second.
Residence time: about 13 seconds.
Reactor temperature: 605° C.
Total run time: 40 minutes.

52 grams of a crude product is obtained, which upon G.L.C. analysis is found to contain 5 mole percent hexachlorobenzene and 91 mole percent of pentachlorocyanobenzene.

Example 6: The apparatus and general procedure of Example 5 is employed with the following variables:

Feed: solution of 10 percent by weight of N,N-dimethylaniline in carbon tetrachloride.
Feed rate: 5.47 grams per minute.
Vaporization temperature: about 220° C.
Molar ratio of chlorine/N,N-dimethylaniline: about 22.
Chlorine feed rate: 7.0 grams per minute.
Nozzle velocity: about 3310 centimeters per second.
Residence time: about 14 seconds.
Reactor temperature: 600° C.
Total run time: 42 minutes.

56 grams of a crude product is obtained, which upon G.L.C. analysis is found to contain 17 mole percent hexachlorobenzene, 9 mole percent of unidentified material and about 74 mole percent of pentachlorocyanobenzene.

Example 7: The apparatus and general procedure of Example 5 is employed with the following variables:

Feed: solution of 10 percent by weight of N-ethylaniline in carbon tetrachloride.
Feed rate: 6.33 grams per minute.
Chlorine feed rate: 7.0 grams per minute.
Vaporization temperature: about 230° C.
Molar ratio of chlorine/N-ethylaniline: about 19.
Nozzle velocity: about 3440 centimeters per second.
Residence time: about 13 seconds.
Reactor temperature: 600° C.
Total run time: 34 minutes.

49 grams of a crude product is obtained, which upon G.L.C. analysis is found to contain 18 mole percent hexachlorobenzene and 72 mole percent pentachlorocyanobenzene.

Example 8: The apparatus and general procedure of Example 5 is employed with the following variables:

Feed: solution of 10 percent by weight of N-(n-propyl) aniline in carbon tetrachloride.
Feed rate: 6.06 grams per minute.
Chlorine feed rate: 7.0 grams per minute.
Vaporization temperature: about 250° C.
Reactor temperature: 600° C.
Molar ratio of chlorine/N-(n-propyl)aniline: about 22.
Nozzle velocity: about 3380 centimeters per second.
Residence time: about 14 seconds.
Total run time: 33 minutes.

46 grams of a crude product is obtained, which upon G.L.C. analysis is found to contain 7 mole percent hexachlorobenzene and 57 mole percent pentachlorocyanobenzene.

Example 9: The apparatus and general procedure of Example 5 is employed with the following variables:

Feed: solution of 5 percent by weight of 2,3,5-trichloro-6-(dimethylamino)pyrazine in carbon tetrachloride.
Feed rate: 4.93 grams per minute.
Chlorine feed rate: 6.05 grams per minte.
Vaporization temperature: about 320° C.
Molar ratio of chlorine/2,3,5-trichloro-6-(dimethylamino)pyrazine: about 79.
Nozzle velocity: about 2820 centimeters per second.
Residence time: about 16 seconds.
Reactor temperature: 590° C.
Total run time: 280 minutes.

71 grams of a crude product is obtained, which upon G.L.C. analysis is found to contain 31 mole percent tetrachloropyrazine, 47 mole percent of 2,3,5-trichloro-6-cyanopyrazine and 22 mole percent of other chlorinated products.

Example 10: The apparatus and general procedure of Example 5 is employed with the following variables:

Feed: solution of 5 percent by weight of 2-chloro-4-(dimethylamino)pyrimidine in carbon tetrachloride.
Feed rate: 4.26 grams per minute.
Chlorine feed rate: 6.05 grams per minute.
Vaporization temperature: 320° C.
Molar ratio of chlorine/2-chloro-4-(dimethylamino)pyrimidine: about 61.
Nozzle velocity: about 2770 centimeters per second.
Residence time: about 16 seconds.
Reactor temperature: 600° C.

17 grams of a crude product is obtained, which upon G.L.C. analysis is found to contain 10 mole percent hexachloroethane, 10 mole percent tetrachloropyrimidine, 40 mole percent 2,5,6-trichloro-4-cyano-pyrimidine and 40 mole percent of other chlorinated products.

The products of the present invention have numerous uses. Many of the compounds are useful as intermediates for the preparation of other chlorinated compounds such as chlorocyanopyridyl sulfones, useful as fungicides.

The chlorocyanopyridines can be heated with 10 percent aqueous caustic at temperatures of from about 160° to about 190° C. for about 2 to 3 hours. The pyridinols thus prepared can be reacted with an alkoxy phosporodichloridate or alkoxy phosphorodichloridothioate to prepare various cyanopyridyl phosphorous compounds which have high utility as parasiticides. Such compounds and their various uses are further discussed in U.S. Pat. 3,399,205.

Certain of the products produced by the process of the present invention are useful for the control of undesirable insects. Thus, in representative operations, an aqueous dispersion of 2,3,5-trichloro-6-cyanopyrazine at a dosage of 5 parts by weight per million parts of the total dispersions gives substantially complete control of yellow fever mosquito.

The utilities are exemplified by the following representative citations, which by no means are exhaustive, are examples of knowledge of how to use the products of the disclosed process.

U.S. Pat. 3,325,503—polychlorocyanopyridines are useful to control damping-off organisms.

Koopmans: Chemical Abstracts 60, 3429–30 (1964)—polychlorocyanobenzenes as fungicides.

The polychlorocyanopyridines can also be hydrolized to convert the cyano group to a carboxy group and the carboxylic acid can be employed as a plant growth modifier as shown in U.S. Pat. 3,317,549.

U.S. Pat. 3,120,507—polychlorocyanopyrimidines are employed as dyestuffs for cellulose.

Preparation of starting materials

The mono- and dialkylaminobenzenes and ring substituted alkylaminobenzenes employed as starting materials are available commercially. They can be prepared by the catalytic reaction of aniline with an alkyl alcohol in the presence of hydrochloric acid. This preparation is further described in Wertheim, Organic Chemistry, third edition, pp. 520–524.

The mono- and dialkylaminopyridines and ring substituted alkylaminopyridines employed as starting materials are available commercially. They can be prepared by the method of Sharp described in J. Chem. Soc., pp. 1855–7 (1939), wherein an aminopyridine is reacted in a solvent with an appropriate alkyl halide at 170°–180° C. for about 6 to 7 hours. This preparation is further described in E. Klingsberg, Pyridine and its Derivatives, vol. II, p. 352.

The alkylaminopyrazines employed as starting materials can be prepared by the reaction of a halopyrazine and an appropriate alkylamine at 150° C. for about 7 hours. The procedure is further taught by G. Cheeseman, J. Chem. Soc., pp. 242–247 (1960).

The alkylaminopyrimidines employed as starting materials are known. They can be prepared by known methods including the reaction of dihalopyrimidine with aqueous dialkylamines in alkanols.

What is claimed is:

1. A process of preparing perchlorinated cyano substituted homocyclic or N-heterocyclic aromatic compounds having at least 2 chlorine substituents on the aromatic ring which comprises introducing into a reaction zone with rapid, turbulent mixing, a vaporized mono or dialkyl amino substituted homocyclic or N-heterocyclic aromatic compound wherein each alkyl portion independently contains from 1 to 3 carbon atoms and at least 15 molar proportions of chlorine per molar proportion of said aromatic compound while said reaction zone is maintained at a temperature in the range of from about 500° C. to about 650° C. for about 5 to 60 seconds; said homocyclic aromatic compound being further characterized as being a compound containing six-member rings containing only carbon atoms as ring-forming atoms and said N-heterocyclic aromatic compound being further characterized as being a compound containing six-member rings containing only nitrogen and carbon atoms as ring-forming atoms.

2. A process of claim 1 wherein a substantially inert diluent is present in the reaction zone.

3. A process of claim 2 wherein the substantially inert diluent is carbon tetrachloride.

4. A process of claim 1 wherein the aromatic compound is an alkylamino benzene.

5. A process of claim 1 wherein the aromatic compound is an alkylamino pyridine.

6. A process of claim 5 wherein the alkylamino pyridine is a chlorinated compound.

7. A process of claim 1 wherein the aromatic compound is an alkylamino pyrazine.

8. A process of claim 7 wherein the alkylamino pyrazine is a chlorinated compound.

9. A process of claim 8 wherein the alkylamino pyrazine is a perchlorinated compound.

10. A process of claim 1 wherein the turbulent mixing is sufficient to provide turbulence equal to a Reynolds number of at least 800.

11. A process of claim 1 wherein the aromatic compound is an alkylamino pyrimidine.

References Cited

UNITED STATES PATENTS

| | | | |
|---|---|---|---|
| 3,420,833 | 1/1969 | Taplin | 260—283 R |
| 3,344,142 | 9/1967 | Powell et al. | 260—250 R |
| 3,452,016 | 6/1969 | Horne | 260—250 R |
| 3,471,496 | 10/1969 | Gulbenk | 260—250 R |
| 3,501,472 | 3/1970 | Wilcox et al. | 260—250 R |

OTHER REFERENCES

Holtschmidt et al., Agnew Chem. International Edit., vol. I (1962), No. 12, pp. 632–639.

Holtschmidt et al., Agnew Chem. International Edit., vol. 7 (1968), No. 11, pp. 856–867.

NICHOLAS S. RIZZO, Primary Examiner

U.S. Cl. X.R.

260—251, 294.9, 465 G